United States Patent [19]
Potier

[11] Patent Number: 5,597,038
[45] Date of Patent: Jan. 28, 1997

[54] ASSEMBLY COMPRISING A MOTORIZED FAN UNIT FIXED ON A HEAT EXCHANGER

[75] Inventor: Michel Potier, Rambouillet, France

[73] Assignee: Valeo Thermique Moteur, Le Mesnil-Saint-Denis, France

[21] Appl. No.: 592,985

[22] Filed: Jan. 29, 1996

[30] Foreign Application Priority Data

Jan. 30, 1995 [FR] France ................ 95 01042

[51] Int. Cl.⁶ ........................................ F24H 3/02
[52] U.S. Cl. .................. 165/121; 123/41.49; 180/68.4
[58] Field of Search ................ 123/41.49, 41.01; 165/121; 180/68.4

[56] References Cited

U.S. PATENT DOCUMENTS

| | | | |
|---|---|---|---|
| 1,306,976 | 6/1919 | Searles | 165/121 |
| 1,791,924 | 2/1931 | Florman | 165/121 |
| 2,265,054 | 12/1941 | Baker | 165/121 |
| 2,879,040 | 3/1959 | McInnes | 165/121 |
| 3,061,277 | 10/1962 | Anderson | 165/121 |

FOREIGN PATENT DOCUMENTS 0183586  6/1986  European Pat. Off. .

*Primary Examiner*—John Rivell
*Assistant Examiner*—Christopher Atkinson
*Attorney, Agent, or Firm*—Morgan & Finnegan, L.L.P.

[57] ABSTRACT

In an assembly of a heat exchanger, such as a motor vehicle engine cooling radiator, with a motorised fan unit for directing a forced flow of air through the heat exchanger, the motor of the fan unit has a base plate which bears on one of the major faces of the matrix of the heat exchanger, which consists of tubes and fins fitted over the tubes. The base plate has lugs extending radially outwardly and formed with holes. In order to fasten the motorized fan unit to the heat exchanger, the matrix of the latter is clamped between the motor base plate and a securing plate which is applied on the opposite major face of the matrix, by means of screws through the respective holes in the lugs. Each screw is surrounded by a spacing sleeve fixed to the securing plate and abutting endwise on the corresponding lug of the motor base plate. The spacers and associated screws extend through apertures formed by cutting portions out of appropriate fins, to form voids through the whole thickness of the matrix.

11 Claims, 2 Drawing Sheets

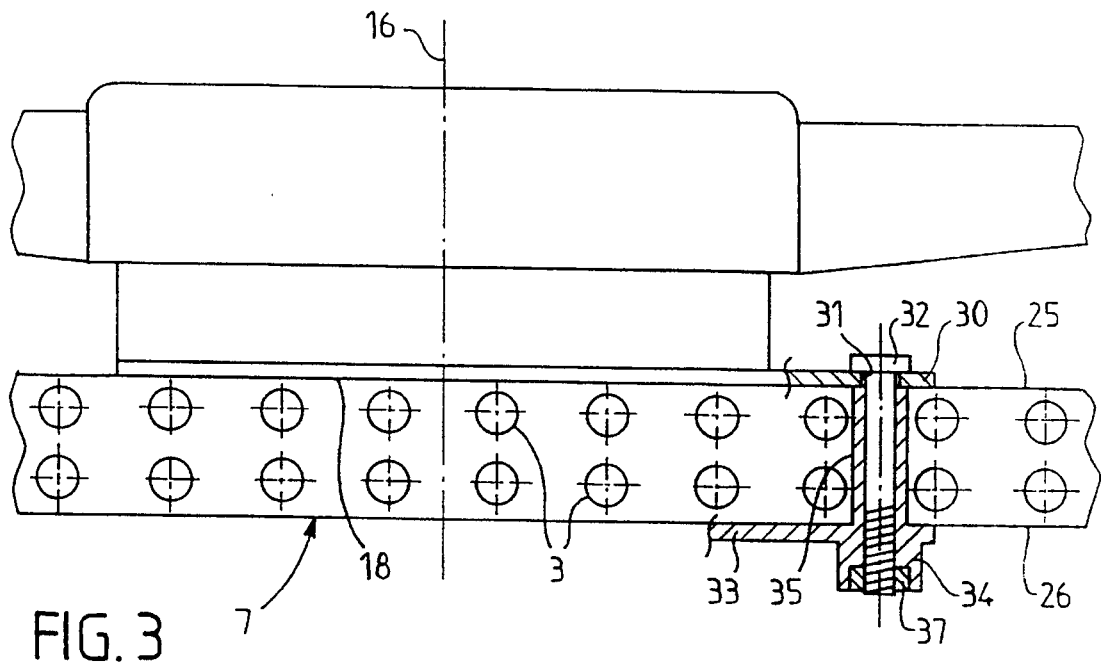
FIG. 3
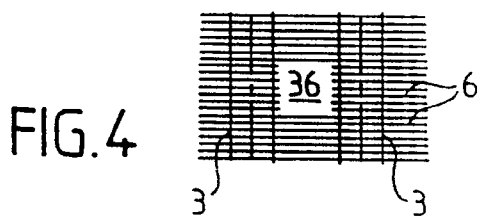
FIG. 4
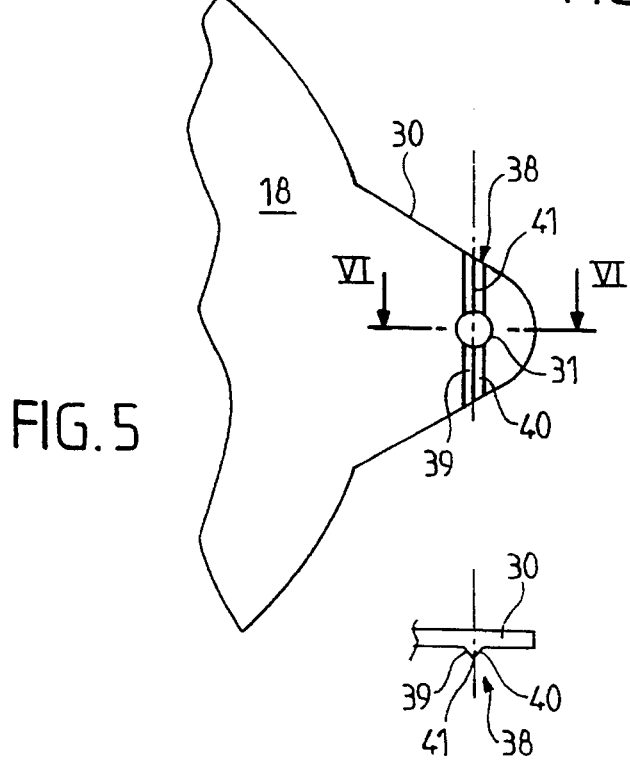
FIG. 5
FIG. 6

ASSEMBLY COMPRISING A MOTORIZED FAN UNIT FIXED ON A HEAT EXCHANGER

FIELD OF THE INVENTION

This invention relates to an assembly comprising a heat exchanger in combination with a motorised fan unit for producing a stream of air in thermal contact with the heat exchanger. Such a heat exchanger, in the field of this invention, comprises a rigid matrix which has first and second major faces lying in substantially parallel planes, and which consists of at least one row of tubes parallel to each other and parallel to the said planes, together with cooling fins fixed on the outside of the tubes. The motorised fan unit comprises a fixed part and a rotating part driven by the said fixed part, and the rotating part is rotatable about an axis of rotation at right angles to the said planes of the major faces of the matrix. The fixed part includes a base plate facing towards the said first major face of the matrix, and is secured through its base plate to the heat exchanger. The fixed and rotating parts of the motorised fan unit constitute its motor and fan respectively, and can for convenience be referred to as such.

BACKGROUND OF THE INVENTION

Such an assembly is known especially in connection with the cooling of heat engines of vehicles. In these known arrangements, fluid headers are situated at the two ends of the matrix (considered in the longitudinal direction of the tubes of the latter). The headers are joined together by means of longitudinal stretchers, and the motorised fan unit is assembled to the headers or the stretchers or both. Since the base plate of the motor occupies a central position on the matrix, relatively long cross members have to be provided, whereby the base plate is fastened to the headers and/or stretchers. This adds considerably to the weight of the assembly, and also makes it difficult to obtain an assembly of sufficient rigidity.

DISCUSSION OF THE INVENTION

An object of the invention is to overcome the above mentioned drawbacks.

According to the invention, an assembly comprising a heat exchanger having a rigid matrix, defining first and second major faces disposed in substantially parallel planes and consisting of at least one row of tubes parallel to each other and parallel to the said planes, together with cooling fins, in combination with a motorised fan unit for producing a stream of air in thermal contact with the heat exchanger, the motorised fan unit comprising a fixed part and a rotating part driven by the said fixed part, the rotating part being rotatable about an axis of rotation at right angles to the said planes of the major faces of the matrix, with the fixed part including a base plate facing towards the said first major face of the matrix, and being secured through its base plate to the heat exchanger, is characterised in that the said matrix is clamped between first abutment elements fixed to the base plate and bearing on the said first face, and second abutment elements bearing on the said second face, by means of fastening elements, such as screws, which extend through the matrix, the first abutment elements and the second abutment elements being retained, at a distance between them which corresponds substantially to the thickness of the matrix, by spacing elements which also extend through the matrix, with each fastening element and each spacing element being disposed in an aperture of the matrix extending between two adjacent tubes in each row, each said aperture being formed from cuts made in a plurality of adjacent fins of the matrix through the whole thickness of the latter.

The fastening elements are preferably disposed, in the plane of one of the said major faces, at the corners of a polygon surrounding the axis of rotation of the motorised fan unit.

Each spacer element is preferably formed in one piece with one of the said first and second abutment elements with which it is associated, and is abutted against the other one of these elements.

All of the first abutment elements may be part of the same single component. Alternatively or in addition, all of the second abutment elements may be part of the same single component. Preferably, the first abutment elements are part of the said base plate.

The first abutment elements are preferably in the form of lugs extending radially outwardly of the fixed part, or motor, of the motorised fan unit.

The said rotating part, or fan, of the motorised fan unit preferably comprises a hub of a fan rotor, the said fastening elements then being disclosed radially outwardly of the diameter of the hub.

Preferably, each spacer element is substantially annular and surrounds the associated fastening element.

According to a preferred feature of the invention, each said first abutment element has, on that one of its surfaces which faces towards the matrix, at least one narrow rib which extends lengthwise so as to bridge the adjacent edges of a plurality of the fins of the matrix, the rib being adapted to deform these fin edges so as to form a recess which constitutes a seating for the rib. This arrangement provides a very stable locating means for the abutment element, and hence for the motorised fan unit as a whole, with respect to the matrix. The profile of each said rib is preferably V-shaped for penetration by the outer edge, or apex, of the V into the said edges of the associated fins.

According to another preferred feature of the invention, each of the said apertures through the matrix has a rectangular profile, and is formed by removing strips of equal width from all of the fins concerned.

The various features and advantages of the invention will appear more clearly from a reading of the following detailed description of a preferred embodiment of the invention, given by way of example only and with reference to the accompanying drawings.

BRIEF DESCRIPTION OF THE DRAWINGS

FIG. 3 is a partial view, in cross section taken on the line III–III in FIG. 2.

FIG. 4 is a partial front view of the matrix of tubes and fins, showing an aperture for the passage of a fastening screw with an associated spacer element.

FIG. 5 is a scrap view of the base plate of the motorised fan unit, showing one abutment lug.

FIG. 6 is a scrap view in cross section taken on the line VI—VI in FIG. 5.

DESCRIPTION OF A PREFERRED EMBODIMENT OF THE INVENTION

Figure 1:
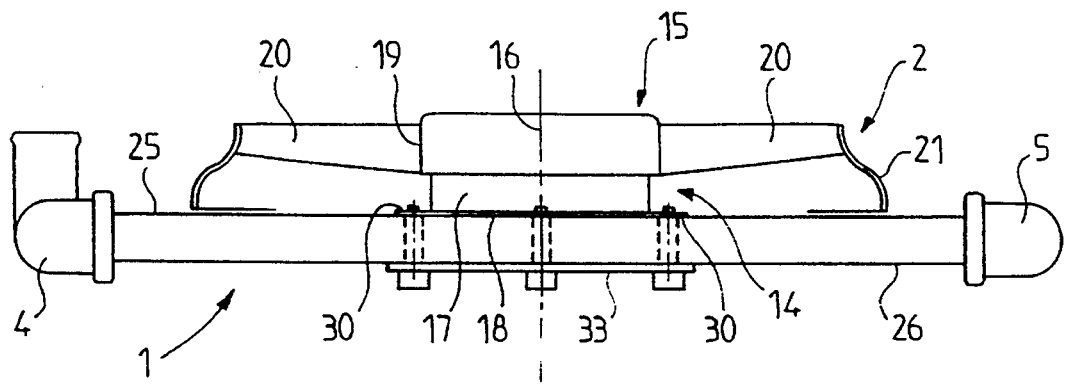
FIG. 1 is a side view of an assembly in accordance with the invention.
Figure 2:
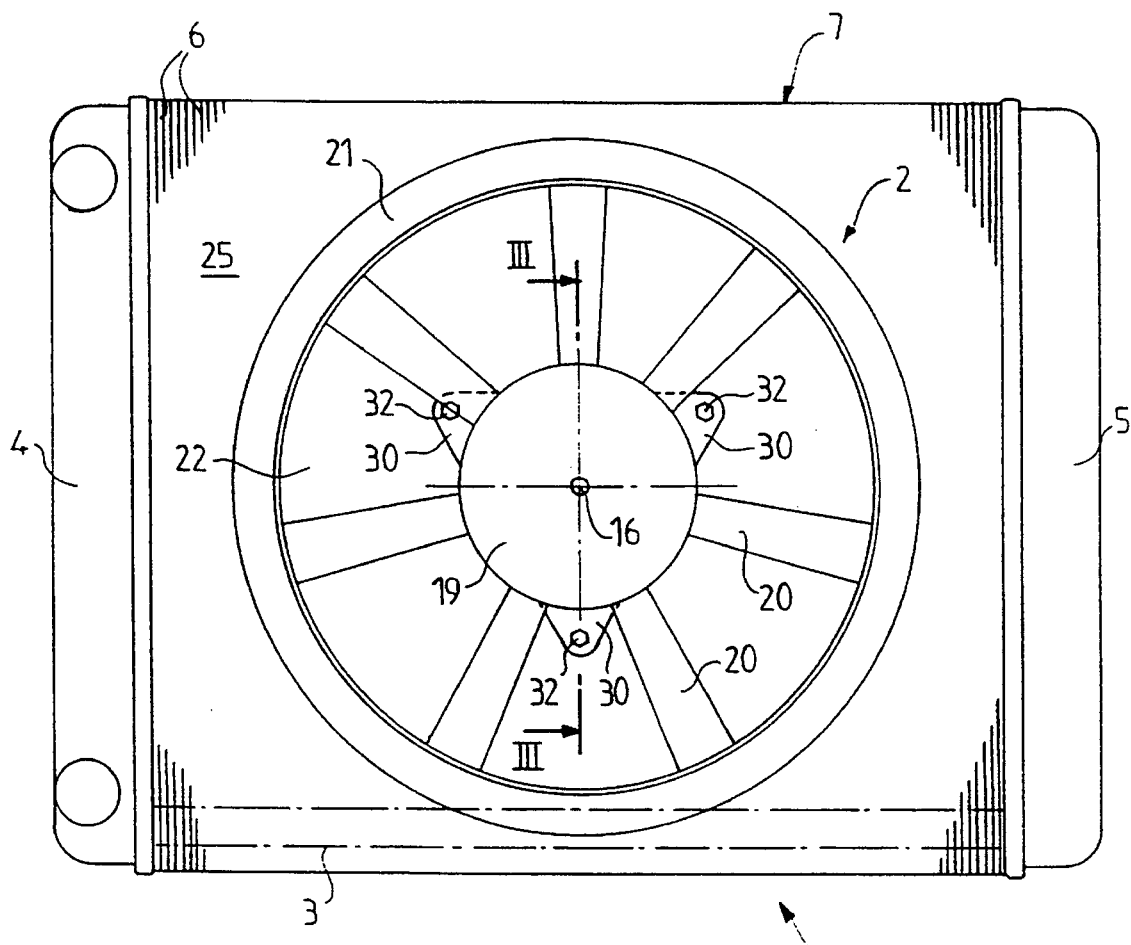
FIG. 2 is a front view of the same assembly.

The assembly shown in the drawings comprises a heat exchanger, in this example a radiator 1 for cooling the coolant fluid for the engine of a motor vehicle, together with a motorised fan unit 2 for driving a stream of air through the radiator. The latter comprises a set of parallel tubes 3, which in this example are arranged in two juxtaposed rows. The two ends of each tube are open into two fluid headers 4 and 5 respectively. The tubes 3 extend through thin rectangular metal cooling fins 6, which lie in planes at right angles to the longitudinal direction of the tubes 3. The tubes are seamed into holes in the fins 6 so as to give good thermal contact between tubes and fins. The tubes thus form, with the fins, a rigid matrix 7, in the form of a parallelepiped, which is interposed between the two headers 4 and 5.

The motorised fan unit 2 consists of a fixed part comprising an electric motor 14, together with a rotating part comprising a fan rotor 15. The rotor 15 is arranged to rotate with respect to the fixed part 14 and with respect to the radiator 1, about an axis of rotation 16 at right angles to the major faces 25 and 26 of the matrix 7. The motor 14 has a body 17 which is substantially in the form of a cylinder of revolution, closed on the side nearest to the matrix 7 by a substantially circular base plate 18. The fan rotor 15 has a hub 19 which caps the motor body 17. This hub 19 is open towards the matrix 7 and closed on its opposite side. A set of radial blades 20 extends outwardly from the hub 19, with the outermost ends of the blades 20 being joined together by an outer ring or shroud 21 centred on the axis 16. The shroud 21 defines an annular passage 22 for the air stream generated by the blades 20 of the fan rotor.

The base plate 18 has three abutment lugs 30 which project radially beyond the diameter of the motor body 17. The lugs 30 are spaced apart from each other by 120° around the axis 16. Each lug 30 has a circular through hole 31, with the centres of the three holes 31 being disposed at the corners of an, equilateral triangle. The lugs 30 and their through holes 31 serve for the fastening of the base plate 18, and therefore of the motorised fan unit 2, on to the matrix 7 by means of three screws 32 and a securing plate 33. The base plate 18 and the securing plate 33 are held by the screws 32 against the major faces 25 and 26, respectively, of the matrix. The securing plate 33 includes, in facing relationship with each of the abutment lugs 30, a boss 34 (see FIG. 3) which projects on the side away from the matrix 7.

The plate 33 also includes a tubular sleeve 35 which extends parallel to the axis 16, and which is engaged in an aperture 36 formed through the entire thickness of the matrix 7. As can be seen in FIG. 3, the sleeve 35 passes between two adjacent tubes 3 in each row of tubes. The bore of the sleeve 35 is aligned with the hole 31 in the corresponding abutment lug 30, and is extended through the associated boss 34 to the outer end of the latter, where the bore is widened so as to accommodate a nut 37. This nut is fitted on to the associated screw 32, which is engaged in the hole 31 and in the bore of the sleeve, so as to bring the base plate 18 and securing plate 33 towards each other when tightened. This relative movement of the two plates 18 and 33 is however limited by the presence of the sleeve 35 when the free end of the latter comes into abutment on the abutment lug 30 as shown in FIG. 3.

Since the length of the sleeve 35 is equal to the thickness of the matrix 7, the base plate 18 and securing plate 33 are simply placed on the respective faces 25 and 26 of the matrix, without causing any damage to the latter. However, in order to prevent any sliding movement of the base plate 18 with respect to the matrix 7, each abutment lug 30 has, on that one of its surfaces which faces towards the matrix, a locating rib 38 with a V-shaped profile. Each locating rib 38 has two inclined faces 39 and 40, constituting a dihedral, the edge 41 of which is at right angles to the edges of the fins 16 that define the face 25 of the matrix. In the example shown, the edge 41 intersects the axis of the hole 31, and the rib 38 is divided by the latter into two parts. While the screws 32 are being tightened, the rib 38, starting with its edge 41, becomes engaged on the edges of several adjacent fins 6, and slightly deforms the latter, so as to form a seating for the rib 38.

As can be seen in FIG. 4, the aperture 36 has a rectangular profile, and more precisely a square profile, the length of each side of which corresponds to the diameter of the sleeve 35. This aperture is formed by the omission, in a plurality of successive fins 6, of a rectangular strip having a length corresponding to the thickness of the matrix 7. The width of this strip corresponds to the dimension of the aperture 36 in the direction in which the tubes 3 of each row are aligned. Each fin 6 which is interrupted in this way is entirely separated into two parts, lying on either side of the aperture, The aperture 36 can be formed without difficulty by removing the appropriate section from each of the fins concerned, for example by the use of a punch on all of these fins simultaneously.

The securing plate 33 may be made by moulding in a suitable plastics material. It may be generally in the form of an equilateral triangle, the sides of which are parallel to those of the triangle of which the corners define the centres of the holes 31.

The number of fastening screws, or the number of equivalent fastening members, may be greater than three if desired,

What is claimed is:

1. In combination, a heat exchanger and a motorized fan unit for producing a stream of air in thermal contact with the heat exchanger, the heat exchanger comprising a rigid matrix defining a first major face and a second major face in respective planes substantially parallel to each other and defining between them a transverse thickness of the matrix, the matrix consisting of at least one row of tubes parallel to each other and to the planes, and cooling fins attached to the tubes, the motorized fan unit comprising a fixed part which includes a base plate in facing relationship with the first major face of the matrix, with securing and locating means securing the base plate to the heat exchanger, the fixed part of the fan unit defining an axis of rotation perpendicular to the planes of the major faces of the matrix, the fan unit further comprising a rotatable part carried by the fixed part for rotation on the axis of rotation, wherein the matrix has apertures through the thickness of the matrix, with a plurality of adjacent said fins of the matrix being interrupted by a void defining each aperture and extending over the whole thickness of the matrix and between two adjacent tubes in each said row, and wherein the securing and locating means comprises: first abutment elements in fixed relationship to the base plate and bearing on the first face of the matrix; second abutment elements bearing on the second face of the matrix; fastening elements extending through the matrix and clamping the matrix between the first abutment elements and second abutment elements; and spacing elements extending through the matrix and retaining each first element in spaced relationship from the corresponding second abutment element by substantially the thickness of the matrix, each fastening element and each abutment element being together disposed in one of the apertures.

2. The combination of claim 1, wherein the fastening elements define, and are located on, the corners of a polygon surrounding the axis in the plane of one of the major faces.

3. The combination of claim 1, wherein each spacing element is integral with one of the first and second abutment elements with which it is associated, and bears, in abutting relationship, on the other of the elements.

4. The combination of claim 1, wherein all of the abutment elements in a group selected from said first abutment elements and said second abutment elements are defined in a single component.

5. The combination of claim 4, wherein the first abutment elements are part of the base plate.

6. The combination of claim 5, wherein the first abutment elements are lugs extending radially outwardly of the fixed part of the motorized fan unit.

7. The combination of claim 6, wherein the rotatable part comprises a hub for a fan rotor, the fastening elements being disposed radially outwardly of the diameter of the hub.

8. The combination of claim 1, wherein each spacer element is substantially annular and surrounds the associated fastening element.

9. The combination of claim 1, wherein each said first abutment element has, on its surface facing the matrix, at least one narrow rib which extends lengthwise so as to bridge the associated edges of a plurality of adjacent fins of the matrix, the rib being such as to deform the edges to form its own seating in the fins, whereby to give stable location of the abutment element with respect to the matrix.

10. The combination of claim 9, wherein each rib has a V-shaped profile defining an edge penetrating into the edges of the fins.

11. The combination of claim 1, wherein each aperture through the matrix has a rectangular profile and is formed by removal of strip portions of equal width from all of the plurality of adjacent fins.

* * * * *